United States Patent
Yates et al.

(10) Patent No.: US 10,823,827 B2
(45) Date of Patent: Nov. 3, 2020

(54) IMAGING SYSTEM, DISTANCE MEASURING DEVICE, AND METHOD FOR OPERATING THE IMAGING SYSTEM AND THE DISTANCE MEASURING DEVICE

(71) Applicant: ROCKWELL AUTOMATION LIMITED, Buckinghamshire (GB)

(72) Inventors: Chris Yates, Edinburgh (GB); Chris Softley, Gorebridge (GB); Igor Abrosimov, Dalkeith (GB)

(73) Assignee: ROCKWELL AUTOMATION LIMITED, Buckinghamshire (GB)

(*) Notice: Subject to any disclaimer, the term of this patent is extended or adjusted under 35 U.S.C. 154(b) by 213 days.

(21) Appl. No.: 15/990,627

(22) Filed: May 26, 2018

(65) Prior Publication Data

US 2018/0275255 A1    Sep. 27, 2018

Related U.S. Application Data

(63) Continuation of application No. PCT/EP2016/078911, filed on Nov. 25, 2016.

(30) Foreign Application Priority Data

Nov. 26, 2015   (DE) .................. 10 2015 120 527

(51) Int. Cl.
*G01C 3/08* (2006.01)
*G01S 7/4865* (2020.01)
(Continued)

(52) U.S. Cl.
CPC .......... *G01S 7/4865* (2013.01); *G01S 7/4863* (2013.01); *G01S 17/10* (2013.01); *G01S 17/89* (2013.01);
(Continued)

(58) Field of Classification Search
None
See application file for complete search history.

(56) References Cited

U.S. PATENT DOCUMENTS 6,388,243 B1 * 5/2002 Berezin ............. H01L 27/14609
250/208.1
8,686,367 B2   4/2014 Shah
(Continued)

FOREIGN PATENT DOCUMENTS

CN        1601753 A      3/2005
CN      101278550 A     10/2008
(Continued)

OTHER PUBLICATIONS

International Search Report of the European Patent Office in PCT/EP2016/078911 (from which this application claims priority) dated Jan. 3, 2017.
(Continued)

*Primary Examiner* — Isam A Alsomiri
*Assistant Examiner* — Amir J Askarian
(74) *Attorney, Agent, or Firm* — Amin, Turocy & Watson, LLP (57) ABSTRACT

Imaging system includes pixel groups and a trigger generator to generate reset signals and a transfer signal. Each pixel group includes pixels and a programmable memory element to store a first or a second value. Each pixel includes a pixel circuit with a photodiode and a storage capacitance. The pixel circuit, the trigger generator, and the memory element are interconnected to permit the photodiode to be held at a constant voltage when the trigger generator sends the reset signal to the pixel circuit. When the reset signal is switched off, the photodiode accumulates a charge while being irradiated. When the transfer signal is received, the charge is transferred to the storage capacitance. The memory element blocks the transfer signal from arriving on all the pixel (Continued)

circuits when it has stored the first value and passes the transfer signal to all the pixel circuits when it has stored the second value.

23 Claims, 6 Drawing Sheets

(51) Int. Cl.
| | |
|---|---|
| *G01S 17/89* | (2020.01) |
| *G01S 7/4863* | (2020.01) |
| *H04N 5/3745* | (2011.01) |
| *G01S 17/10* | (2020.01) |

(52) U.S. Cl.
CPC ....... *H04N 5/3745* (2013.01); *H04N 5/37452* (2013.01)

(56) References Cited

U.S. PATENT DOCUMENTS

| | | | | |
|---|---|---|---|---|
| 2003/0012063 | A1* | 1/2003 | Chien | G11C 11/406 365/200 |
| 2013/0020471 | A1* | 1/2013 | Korekado | H04N 5/361 250/208.1 |
| 2013/0228691 | A1* | 9/2013 | Shah | G01S 7/4861 250/341.8 |
| 2014/0313387 | A1* | 10/2014 | Vogelsang | H04N 5/35527 348/308 |
| 2015/0055000 | A1* | 2/2015 | Bock | H04N 5/35554 348/308 |
| 2015/0256774 | A1* | 9/2015 | Nishihara | G01J 1/44 348/216.1 |
| 2017/0328991 | A1 | 11/2017 | Yates et al. | |
| 2018/0045513 | A1* | 2/2018 | Kitamura | H04N 5/353 |

FOREIGN PATENT DOCUMENTS

| | | |
|---|---|---|
| CN | 102346250 A | 2/2012 |
| CN | 103297714 A | 9/2013 |
| EP | 1 515 540 A2 | 3/2005 |
| WO | 2016087189 A1 | 6/2016 |

OTHER PUBLICATIONS

Communication pursuant to Article 94(3) EPC received for EP Patent Application Serial No. 16801271.4 dated Apr. 29, 2019, 05 page.

First Office Action received for Chinese Patent Application Serial No. 201680078670.2 dated Feb. 3, 2020, 13 pages (Including English Translation).

* cited by examiner

FIG. 10

IMAGING SYSTEM, DISTANCE MEASURING DEVICE, AND METHOD FOR OPERATING THE IMAGING SYSTEM AND THE DISTANCE MEASURING DEVICE

CROSS REFERENCE TO RELATED APPLICATIONS

This application is a continuation application of international patent application PCT/EP2016/078911, filed Nov. 25, 2016, designating the United States and claiming priority to German patent application 10 2015 120 527.0, filed Nov. 26, 2015, and the entire content of both applications is incorporated herein by reference.

TECHNICAL FIELD

The invention relates to an imaging system, a distance measuring device, and a method for operating the imaging system and the distance measuring device.

BACKGROUND

A conventional imaging sensor for taking two-dimensional images, for example a charge-coupled device (CCD) sensor, has a limited dynamical range. Usually, when taking an image with the imaging sensor, the exposure time of the imaging sensor is chosen such that almost the complete dynamical range is used. However, when taking an image of a scene that has dark and light areas, short exposure times can result in dark areas which have a signal-to-noise ratio that is much lower than the signal-to-noise ratio for the light areas. On the other hand, when taking an image of a scene with long exposure times, this can result in a saturation for the light areas.

The dark and light areas in a scene can also occur when the scene is illuminated, for example, by a photoflash. Depending on the optics of the illumination, the scene can be illuminated inhomogeneously. In particular, the illumination can have a hot spot in its center. Furthermore, objects located in the scene and being further away from the imaging sensor appear darker since the intensity of the illumination that arrives on the object drops with the well-known inverse square law $1/r^2$ with r being the distance of the object from the source of the illumination. Also, the reflectivity of the scene can vary, which can also result in dark and light areas. It is furthermore known that the intensity of light reflected back toward the imaging sensor depends on the orientation of the reflecting surface with respect to the source of the illumination and to the imaging sensor. Another source for the dark and the light areas can be the optics that image the scene onto the imaging sensor, since it is difficult to create a uniform illumination of the imaging sensor by the optics.

If the imaging chip is used for a measurement of a distance, the distances measured for the dark areas have a lower signal-to-noise ratio than the distances measured for the light areas. The lower signal-to-noise ratio results in a larger spread of the distance measurements for the dark areas than for the light areas.

SUMMARY

It is therefore an object of the invention to provide an imaging system for taking images and a method for operating the imaging system in which the difference of a signal-to-noise ratio of dark areas in the images in comparison to light areas in the images is reduced.

The imaging system according to an aspect of the invention includes a plurality of pixel groups and a trigger generator configured to generate at least one reset signal and a transfer signal, being arranged in a temporal interval in which the reset signals are switched off, wherein each pixel group includes at least one pixel and a programmable memory element configured to store either a first value or a second value, wherein each of the pixels include a pixel circuit with a photodiode and a storage capacitance, wherein the pixel circuits, the trigger generator and the memory element are interconnected so that when the trigger generator sends the reset signal to the pixel circuit, the photodiode is held at a constant voltage, when the reset signal is switched off, the photodiode is configured to accumulate a charge when it is electromagnetically irradiated, when the trigger generator sends the transfer signal to the circuit, the charge is transferred from the photodiode to the storage capacitance, and the memory element is configured to block the transfer signal from arriving on all the pixel circuits of the corresponding pixel group when it has stored the first value and is configured to pass the transfer signal to all the pixel circuits of the corresponding pixel group when it has stored the second value.

Since the imaging system includes the plurality of the pixel groups, images of a scene can be recorded by the imaging system. If the pixel groups are provided in a two-dimensional array, two-dimensional images can be recorded. By controlling the photodiode by the reset signal such that the photodiode is either held at the constant voltage or configured to accumulate the charge, it is achieved that the photodiode can only capture electromagnetic irradiation when the reset signal is switched off. It is therefore achieved that the pixels are provided with a shutter by which it is possible to control an exposure time of the pixel. By providing the storage capacitance and the transfer signal for transferring the charge, accumulated in the photodiode during time periods when the reset signal is switched off, from the photodiode to the storage capacitance, it is advantageously achieved that the electromagnetic irradiation from dark areas of the scene can be measured with an increased precision by transferring the charge from the photodiode to the storage capacitance over a multitude of accumulation cycles each including one of the reset signals and one of the transfer signals. By providing the memory element for each pixel group, it is advantageously achieved that a different number of the accumulation cycles can be chosen for each of the pixel groups without the need to provide different reset signals for each of the pixel groups. In this manner, a low number of the accumulation cycles can be chosen for the pixel groups which capture the electromagnetic irradiation from light areas of the scene. Therefore, a saturation of the corresponding storage capacitances can advantageously be avoided. On the other hand, a high number of the accumulation cycles can be chosen for the pixel groups which capture electromagnetic irradiation from dark areas of the scene. In this manner, the signal-to-noise ratio for the corresponding pixels can be increased. By accordingly choosing the low and high numbers of the accumulation cycles, it is advantageously achieved that the difference of the signal-to-noise ratio of the dark areas in the image in comparison to the signal-to-noise ratio of the light areas in the image is reduced.

According to another aspect of the invention, each of the pixel groups includes a memory control circuit configured to write the second and first value to the corresponding memory element, and a conditioning circuit configured to block and pass the transfer signal based on the value stored in the corresponding memory element.

The memory element is typically selected from a group consisting of a six-transistor static RAM cell, a four-transistor static RAM cell, or a dynamic memory cell including a memory capacitance, wherein the memory capacitance is selected from a group consisting of a diode junction in reverse bias, a MOS gate, in particular with a conductor made from metal or polysilicon, a metal-insulator-metal (MIM) capacitor, a polysilicon-polysilicon capacitor, or a polysilicon-metal capacitor. The static RAM cells include the memory control circuit. In case the memory element includes the dynamic memory cell, the memory element has a memory control circuit, for example a MOS transistor capable of creating electrical connection between the memory element and a signal line under control of a control line of the imaging system.

According to a further aspect of the invention, the conditioning circuit is a dynamic logic AND gate, and the memory element is a dynamic memory cell including a memory capacitance. The memory capacitance is selected from a group consisting of a diode junction in reverse bias, a MOS gate, in particular with a conductor made from metal or polysilicon, a metal-insulator-metal (MIM) capacitor, a polysilicon-polysilicon capacitor, or a polysilicon-metal capacitor. The transfer signal includes a high transfer signal and a low transfer signal being substantially inverse to the high transfer signal. The memory capacitance is electrically conductive connected to one of the INPUTs of the dynamic logic AND gate. The high transfer signal is provided to be sent to the other one of the INPUTs of the dynamic logic AND gate, the low transfer signal is provided to be sent to the PRECHARGE of the dynamic logic AND gate, and the OUTPUT of the dynamic logic AND gate is electrically conductive connected to the pixel circuit to send the transfer signal TS to the pixel circuit. It is therefore achieved that after each of the accumulation cycles, the transfer signal is refreshed to a low level, i.e., the transfer signal is reliably switched off. Switching off the transfer signal in this way prevents further accumulation of charge in the pixels in subsequent accumulation cycles, until a new image capture is initiated (which includes re-programming the memory cell to the second value). This prevention of further accumulation is achieved regardless of the point in time during the acquisition sequence at which the programming of the memory cell to the first value occurs.

Each of the pixel circuits typically includes a first charge transfer device configured to hold the photodiode at the constant voltage when the reset signal is sent to the pixel circuit, a second charge transfer device configured to transfer the charge from the photodiode to the storage capacitance when the transfer signal is sent to the pixel circuit, a storage device that includes the storage capacitance and is configured to discharge the storage capacitance, and a read-out circuit that is configured to read out the charge in the storage capacitance. The first charge transfer device can for example include a first electrical or charge-coupled connection which serves to electrically connect one end of the photodiode to a power supply when the first electrical or charge-coupled connection is closed while the other end of the photodiode is permanently electrically connected to a ground. The second charge transfer device includes, for example, a second electrical or charge-coupled connection which serves to electrically connect the one end of the photodiode to one end of the storage capacitance when the second electrical or charge-coupled connection is closed while the other end of the storage capacitance is permanently electrically connected to the ground. Both electrical or charge-coupled connections can be formed, for example, by transistors or transfer gates. The storage capacitance can be discharged when the storage device receives a storage capacitance discharging signal. The read-out circuit may include a voltage follower. The voltage follower includes a voltage follower storage capacitance that has during operating a larger charge than the charge in the storage capacitance while the voltage in the voltage follower storage capacitance and the voltage in the storage capacitance are similar.

According to an aspect of the invention, the photodiode is configured to allow a complete transfer of the charge from the photodiode to the storage capacitance, wherein the photodiode is in particular selected from a group consisting of a PIN (positive intrinsic negative)-photodiode, or a buried photodiode. It is therefore advantageously achieved that the photodiode is completely discharged at the end of each of the transfer signals independent of the charge being present in the storage capacitance. This results in a high precision for the measurement of the electromagnetic radiation.

According to another aspect of the invention, the storage capacitance CFD is selected from a group consisting of a floating diffusion with an ohmic connection to a reset switch, of a storage gate with an ohmic connection to the reset switch. In case the storage gate is selected, an additional transfer gate can be provided in order to provide a charge-coupled connection from a floating channel to a charge drain connection. In the case of the additional transfer gate, both the reset switch and the additional gate are switched on in order to clear the storage gate of the accumulated charge.

Typically, the imaging system is configured to write the second value to each of the memory elements, includes an electronic comparator configured to compare the charge in the storage capacitance of one of the pixel groups to a predefined reference charge and is configured to write the first value to the memory element of the same pixel group in case the charge in the storage capacitance exceeds the predefined reference charge. It is therefore achieved that the dark areas of the scene are measured with a high number of the accumulation cycles and the light areas of the scene are measured with a low number of the accumulation cycles. With the comparator, the imaging system can be fully automatically operated based on the actual levels of brightness of the image. It is furthermore typical that the reference charge is the same for all of the pixel groups. If the pixel group includes a multitude of the pixels, it is conceivable that the comparator is configured to compare the charge of the storage capacitance of only one of the pixels to the reference charge. Furthermore, it is typical that the electronic comparator is configured to write the second value to the memory element of the same pixel group in case the charge in the storage capacitance is lower than or equal to the predefined reference charge. In this manner, the second value is refreshed. This is in particular useful, when the memory element includes a capacitance which is gradually discharged. It is not necessary that the imaging system is configured to compare the charge in the storage capacitances after every accumulation cycle. In order to accelerate the repetition rate of the accumulation cycles, it is possible that the imaging system is configured to compare the charge in the storage capacitance after a multitude of the accumulation cycles.

As an alternative, the imaging system may be configured to write the second value to each of the memory elements and after a predetermined number of the accumulation cycles including for each of the pixels one of the reset signals and one of the transfer signals the first value to each of the memory elements, wherein the imaging system is configured such that a different number of the accumulation cycles can be predetermined for each of the memory elements. Since only one bit of information is required for each of the memory elements, the rate for writing the first and second value to the memory elements is high. This results in a high repetition rate for the accumulation cycles. It is furthermore conceivable that the imaging system is configured to calculate for each of the pixel groups a brightness value by dividing, for one of the pixels of the pixel group after the last transfer of the charge, the charge in the storage capacitance by the corresponding predetermined number of the accumulation cycles. Furthermore, it is typical that the imaging system is configured to write the second value to the memory elements corresponding to the pixel groups which accumulation is not supposed to be ended after the predetermined number of the accumulation cycles in order to refresh the second value for these memory elements.

Typically, the trigger generator is configured to send a plurality of different transfer signals to at least one of the pixels of the pixel groups, wherein each of the pixel groups includes an additional memory element for each of the different transfer signals for blocking and passing the respective transfer signal, wherein the imaging system is configured to write the second value only to one of the additional memory elements. It is therefore possible that during each of the accumulation cycles, different pixel groups capture the electromagnetic radiation at different time periods. In this manner, it is possible with the imaging system to record video sequences that have a higher repetition rate than the repetition rate for the accumulation cycles.

The imaging system typically includes an imaging sensor on which the pixel circuits and the memory elements are arranged, wherein the imaging sensor in particular includes an integrated circuit in which the pixel circuits and the memory elements are arranged. In this manner the memory elements and the corresponding pixels are arranged closely to each other.

The distance measuring device according to an aspect of the invention for measuring a distance between the distance measuring device and an object includes a light source configured to illuminate the object with light pulses, and the imaging system that is configured to capture the light pulses after being back reflected from the object, wherein the trigger generator is configured to start the emission of the light pulses at an emission start point in time and the distance measuring device is configured to measure a time of flight of the light pulse from the emission start point in time to the arrival on the respective pixel group by using the charge in the storage capacitances. Since the signal-to-noise ratio for the pixel groups that capture the light pulses that are back reflected from the dark areas of the scene can be increased by choosing a high number for the accumulation cycles, the signal-to-noise ratio for the corresponding distances can also be increased. As a result, the difference in a spread of the distance values for the dark areas in comparison to a spread of the distance values for the light areas can be reduced.

According to an aspect of the invention, the trigger generator is configured to control the reset signals such that for a predetermined range of the distance, the reset signal for one of the pixels of the pixel group, namely a measurement pixel, is delayed to the emission start point in time so that the photodiode of the measurement pixel is configured to capture the back reflected light pulse partially. The time of flight can be determined by using the charge in the storage capacitance of the measurement pixel, the duration of the light pulse, and the delays of the reset signal of the measurement pixel with respect to the emission start point in time, i.e., the point in time in which the reset signal is switched off and the point in time in which the reset signal is subsequently switched on.

Each of the pixel groups typically includes three of the pixels with one being the measurement pixel, and the trigger generator is configured to send the respective reset signal with a different delay to the emission start point in time to each of the three pixels circuits, wherein the trigger generator is configured to control the reset signals such that for the predetermined range of the distance, the reset signal for another one of the three pixels, namely a reference pixel, is delayed so that the photodiode of the reference pixel is configured to capture the back reflected light pulse completely, the reset signal for another one of the three pixels, namely a background pixel, is delayed so that the photodiode of the background pixel is inhibited to capture the back reflected light pulse, wherein the imaging system is configured to measure the time of flight by using the charge in the storage capacitances corresponding to three pixels. The reference pixel is used for correcting for different object reflectivities, and the background pixel is used for correcting the influence of ambient light, i.e., light that is captured by the pixels but does not originate from the light source. The measurements with the measurement pixel, the reference pixel and the background pixel can be carried out simultaneously, i.e., one single of the light pulses can be captured such that the light pulse is captured partially, completely, and not captured. It is thereby achieved that the distances of moving objects can be captured with a particular high precision. This provides the advantage that differences in subsequent light, in particular differences in intensity and pulse shape, which could adversely affect the measurement of distance, are eliminated.

Other concepts for measuring the time of flight are also possible. In U.S. Patent Application Publication No. 2017/328991, the content of which is incorporated herein in its entirety, it is for example described to form a convolution function $f_c$ by emitting a plurality of long light pulses and measuring each of the long pulses with a different integration gate. It is conceivable to provide for each integration gate a respective pixel so that the complete convolution function $f_c$ can be measured in principle with a single of the accumulation cycles.

According to an aspect of the invention, each of the pixel groups includes four of the pixels, wherein two of the four pixels are the measurement pixels. By providing each pixel group with the four pixels, the pixel groups can be arranged in the imaging system with a high degree of symmetry. Typically, each of the pixel groups includes a multitude of the four pixels with one of the measurement pixels being replaced by the memory element. It is thereby achieved that the number of the memory cells is reduced, which results in a larger area that can be providing for capturing the light and in that the first and second values can be faster written to the memory cells, whilst maintaining the highly regular structure of the pixel matrix.

Maintaining regularity of the pixel matrix makes this simpler to design, and can allow artefacts in the pixel matrix that might arise due to the presence of the memory element to be avoided. To this end, it is further typical to design such a 'memory element pixel' with additional features, in particular at its boundaries, so that it creates the minimum disturbance to the regular structure of the pixel matrix and the environment experienced by neighbouring pixel cells, in order to avoid artefacts in the image. The absence of pixel information at this location can be compensated for by well-known procedures for dealing with defective pixels, which often exist in image sensors. An example of such a defect correction procedure is that a replacement value for the missing pixel information is computed by bilinear interpolation of values of neighbouring pixels.

The method according to an aspect of the invention for operating the imaging system includes the steps of a) providing the imaging system, b) writing the second value to the memory elements, c) sending the reset signals to the corresponding pixel circuits, d) switching off the reset signals, e) sending the transfer signal to all the pixel circuits in a temporal interval in which the reset signals are switched off, f) writing the first value to at least one of the memory elements in case a predetermined condition is fulfilled, g) repeating the steps c) to f) at least once, whereby in step e) the charge transferred from the photodiode to the storage capacitance adds to the charge being present in the storage capacitance from the previous steps e) when the corresponding memory element has stored the second value.

The method according to the an aspect of the invention for operating a distance measuring device includes the steps of a) providing the distance measuring device, b) writing the second value to the memory elements, c0) starting the emission of the light pulse at an emission start point in time, c) sending the reset signals to the corresponding pixel circuits, d) switching off the reset signals, e) Sending the transfer signal to all the pixel circuits in a temporal interval when the reset signals are switched off, f) writing the first value to at least one of the memory elements in case a predetermined condition is fulfilled, g) repeating steps c0) to f) at least once, whereby in step e) the charge transferred from the photodiode to the storage capacitance adds to the charge being present in the storage capacitance from the previous steps e) when the corresponding memory element has stored the second value.

According to an aspect of the invention in step c) different reset signals are sent to different sets of pixel groups, wherein in step b) the second value is written only to the memory elements of one of the sets and after a number of accumulations cycles including one step c), one step d) and one step e), the second value is written in step b) only to the memory elements of another one of the sets. It is hereby possible to choose the reset signals such that the measurement pixels, the reference pixels and the background pixels are adapted to determine the time of flight for a different predetermined range of the distance so that it is possible to alternatingly capture the different ranges. In this manner, the range of the distance that can be measured by the distance measuring device can be extended without the need to provide temporally longer light pulses. Temporally longer light pulses are disadvantageous since the precision for the distance measurement decreases with a longer pulse duration. Also, the lifespan of the light source becomes shorter with longer light pulses, and it becomes more difficult to maintain eye safety for persons exposed to the light source.

If the imaging system is alternatively provided with the additional memory elements as described before, it is also possible to choose the reset signals such that the measurement pixels, the reference pixels and the background pixels of different sets of the pixel groups determine the time of flight for a different predetermined range of the distance. In this manner, it is possible to simultaneously capture the different ranges.

According to another aspect of the invention, in step a) each of the pixel groups is provided with three of the pixels and in step c) the reset signals ($TD_1$ to $TD_3$) are controlled so that they are delayed to the emission start point in time such that for a predetermined range of the distance, the reset signal for one of the three pixels, namely a measurement pixel, is delayed so that the photodiode of the measurement pixel captures the light pulse partially, the reset signal for another one of the three pixels, namely a reference pixel, is delayed so that the photodiode of the reference pixel captures the light pulse completely, and the reset signal for another one of the three pixels, namely a background pixel, is configured to inhibit the photodiode of the background pixel to capture the light pulse.

The method preferably includes the steps of h) reading out all the storage capacitances, whereby a value U being substantially proportional to the charge in the storage capacitance is obtained for each of the pixels, i) calculating the time of flight $T_{TOF}$ of the light pulse from the emission start point in time to the arrival on the respective pixel group using the equation $T_{TOF}=a+b*U_2/U_1$, wherein $U_1=U_{REF}-U_{BKG}$ and $U_2=U_{MEAS}-U_{BKG}$ with $U_{REF}$ being U for the reference pixel, $U_{BKG}$ being U for the background pixel $U_{MEAS}$ being U for the measurement pixel, and a and b being constants. By calculating the time of flight in this manner, knowledge of the number of the accumulation cycles is typically not needed since the three pixels experienced the same number of the accumulation cycles and this number is cancelled out in the calculation of step i).

According to a further aspect of the invention, the method includes the step of c1) comparing the charge in the storage capacitance, in particular the storage capacitance of the reference pixel, to a predefined reference charge after a predetermined number of accumulation cycles including one step c), one step d) and one step e), and wherein in step f) the first value is written to the memory element that corresponds to the storage capacitance in case the charge in the storage capacitance exceeds the predefined reference charge. Typically, the method includes the step of c2) providing for each pixel group the number of the accumulation cycles performed until the charge in the storage capacitance exceeded the predefined reference charge. The number of the accumulation cycles performed until the charge in the storage capacitance exceeded the predefined reference charge can advantageously be used for the calculation of a brightness by dividing the charge accumulated in the storage capacitance being present at the end of the accumulation cycles by the number of the accumulation cycles performed until the charge in the storage capacitance exceeded the predefined reference charge.

Alternatively, the method includes the step of a1) predetermining a respective number $n_2$ of accumulation cycles including one step c), one step d) and one step e) for each of the memory elements; and wherein in step f) the first value is written to the memory element after $n_2$ of the accumulation cycles. In step a1) the number $n_2$ is typically predetermined based on brightness information for each of the pixel groups obtained from an image previously recorded by the imaging system and/or based on expected brightness information for each of the pixel groups. The first alternative for predetermining the number of the accumulation cycles can be useful in a streaming video situation where the brightness of an image can be estimated based on a preceding image. The second alternative for predetermining the number of the accumulation cycles can be useful in a situation where the scene is so constrained that the brightness distribution over the image remains within a predefined range, as it might be the case in a fixed measurement set-up where the objects return consistent brightness profiles.

BRIEF DESCRIPTION OF THE DRAWINGS

The invention will now be described with reference to the drawings wherein.

DESCRIPTION OF EXEMPLARY EMBODIMENTS

Figure 1:
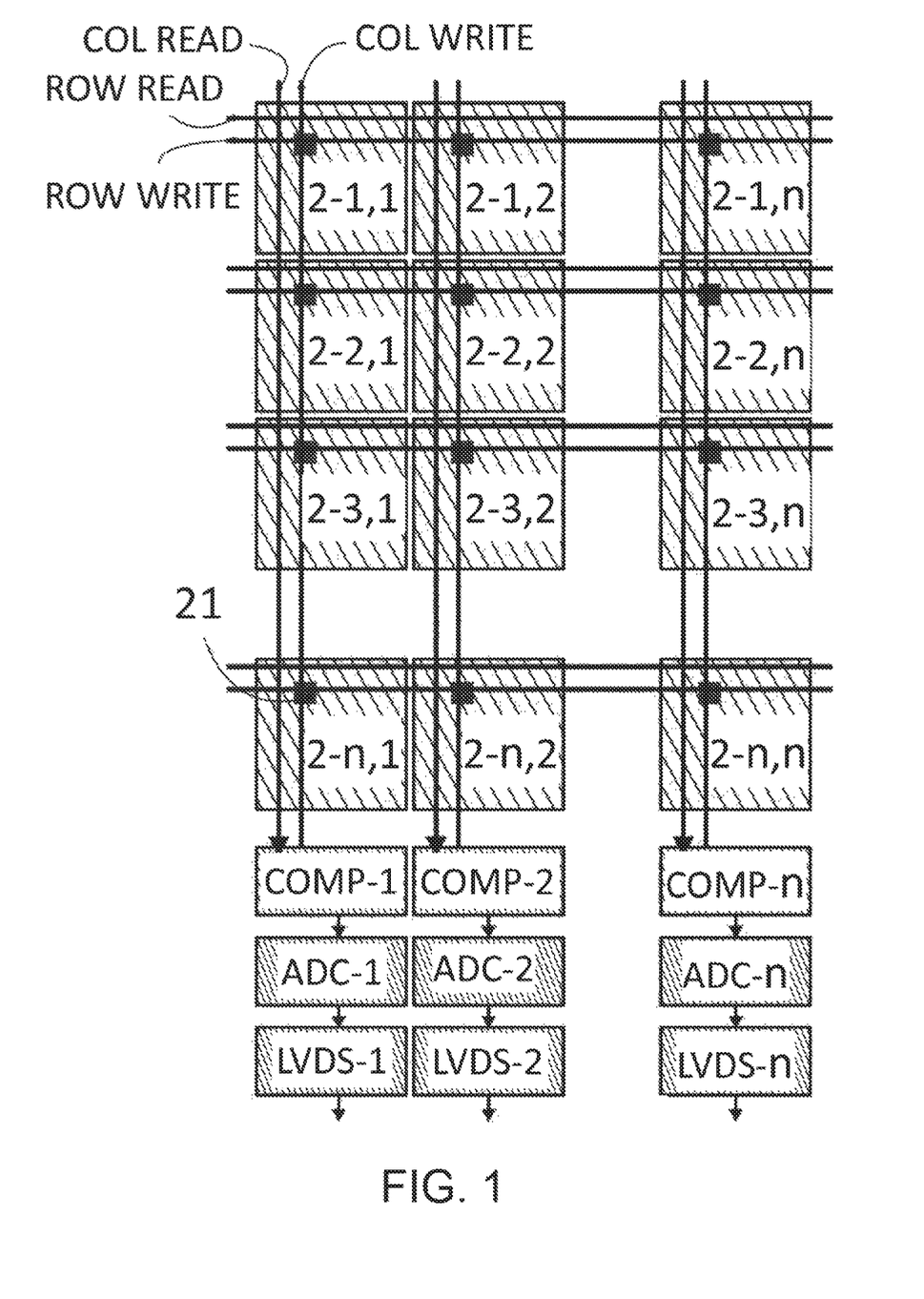
FIG. 1 shows an overview of an imaging system with a plurality of pixel groups.
Figure 2:
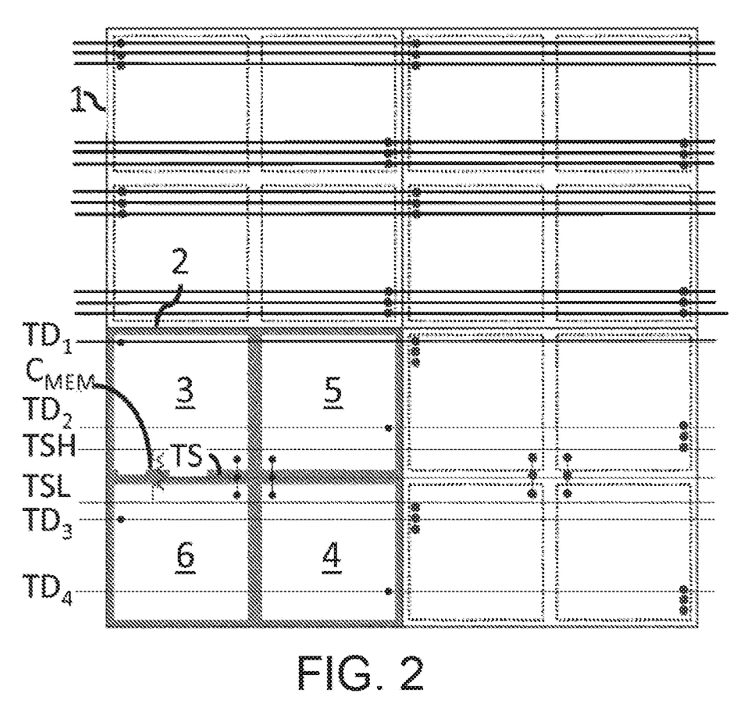
FIG. 2 shows in more detail the pixel groups of FIG. 1.
Figure 4:
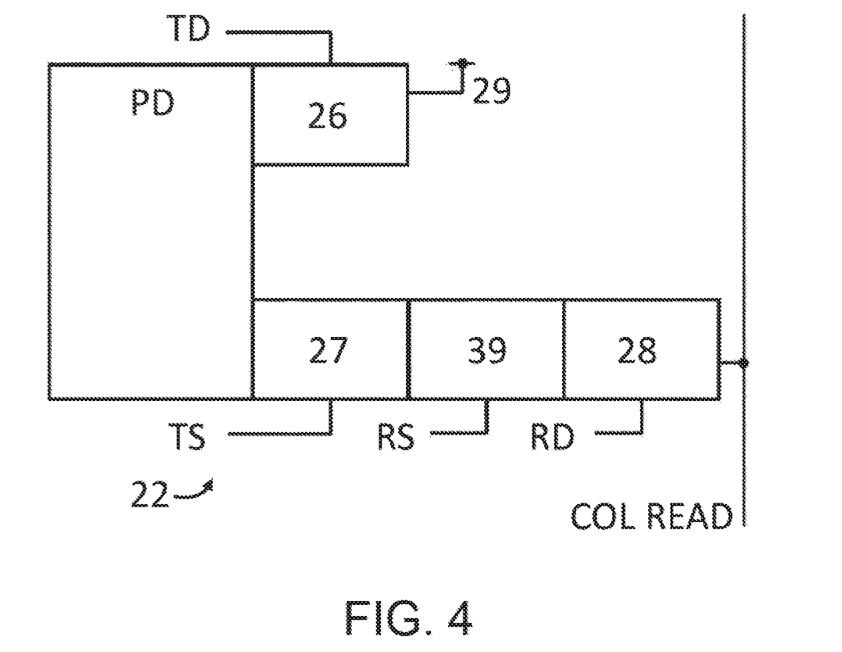
FIG. 4 shows a block diagram of a pixel circuit.
Figure 5:
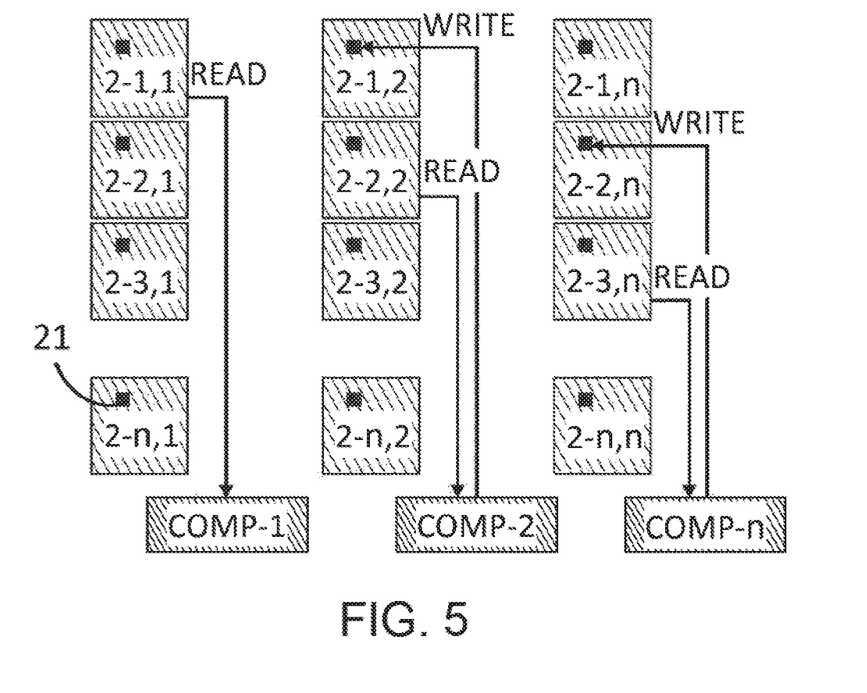
FIG. 5 shows a reading and writing procedure of the imaging system.
Figure 8:
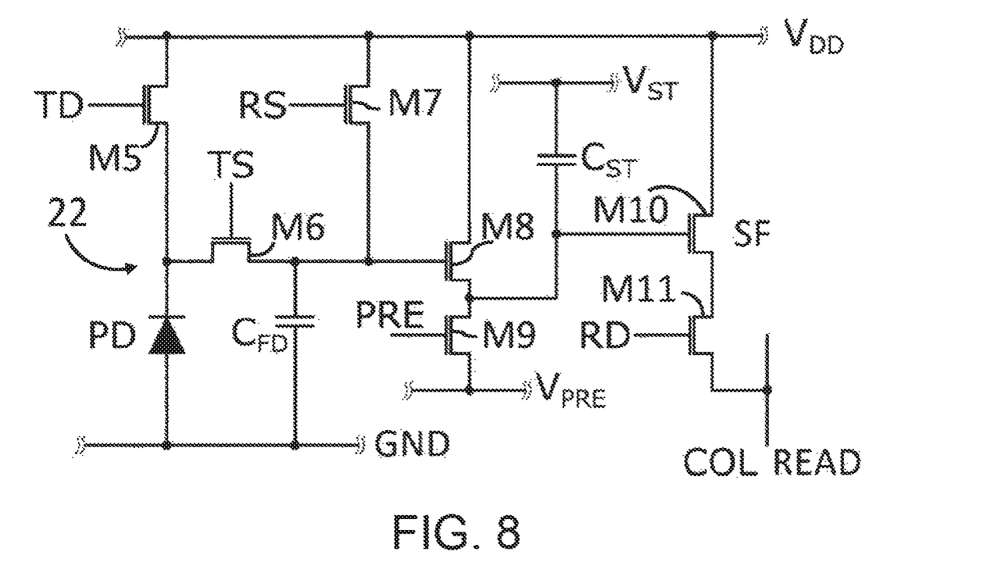
FIG. 8 shows an exemplary embodiment of a pixel circuit.

FIGS. 1, 2 and 5 show an imaging system that includes a plurality of pixel groups 2. The pixel groups 2 are arranged in a two-dimensional array that has n rows and n columns. In FIGS. 1 and 5 the pixel groups 2 are accordingly enumerated from 2-1,1 to 2-n, n. Each of the pixel groups 2 includes at least one pixel 3 to 6 and a programmable memory element 21 configured to store either a first value or a second value. For example, the first value can be zero and the second value can be one. Each of the pixels 3 to 6 includes a pixel circuit 22, wherein an exemplary schematic block diagram for the pixel circuit 22 is shown in FIG. 4 and an exemplary pixel circuit 22 is shown in FIG. 8. Each of the pixel circuits 22 includes a photodiode PD and a storage capacitance $C_{FD}$ (see FIGS. 4 and 8).

The imaging system furthermore includes a trigger generator (not shown) configured to generate for each of the pixels 3 to 6 a reset signal $TD_1$ to $TD_4$ and for each of the pixel groups 2 a transfer signal TS being arranged in a temporal interval in which the reset signals $TD_1$ to $TD_4$ are switched off. The electrical connections for sending the reset signals $TD_1$ to $TD_4$ to the respective pixels 3 to 6 and for sending the transfer signal TS to the pixel groups 2 are shown in FIG. 2. The pixel circuit 22, the trigger generator and the memory element 21 are so interconnected that when the trigger generator sends the reset signal $TD_1$ to $TD_4$ to the pixel circuit 22, the photodiode PD is held at a constant voltage. When the reset signal $TD_1$ to $TD_4$ is switched off, the photodiode PD is configured to accumulate a charge when the photodiode PD is electromagnetically irradiated. When the transfer signal TS is sent to the pixel groups, by the trigger generator providing control signals TSH and TSL, the charge is transferred from the photodiode PD to the storage capacitance $C_{FD}$. The memory element 21 is configured to block the transfer signal TS from arriving on all of the pixel circuits 22 of the corresponding pixel group 2 when it has stored the first value and is configured to pass the transfer signal TS to all of the pixel circuits 22 of the corresponding pixel group 2 when it has stored the second value.

It is conceivable that the imaging system includes an imaging sensor 1 (see FIG. 2) on which the pixel circuits 22 and the memory elements 21 are arranged. It is in particular conceivable that the imaging sensor 1 includes an integrated circuit in which the pixel circuits 22 and the memory elements 21 are arranged.

Figure 3:
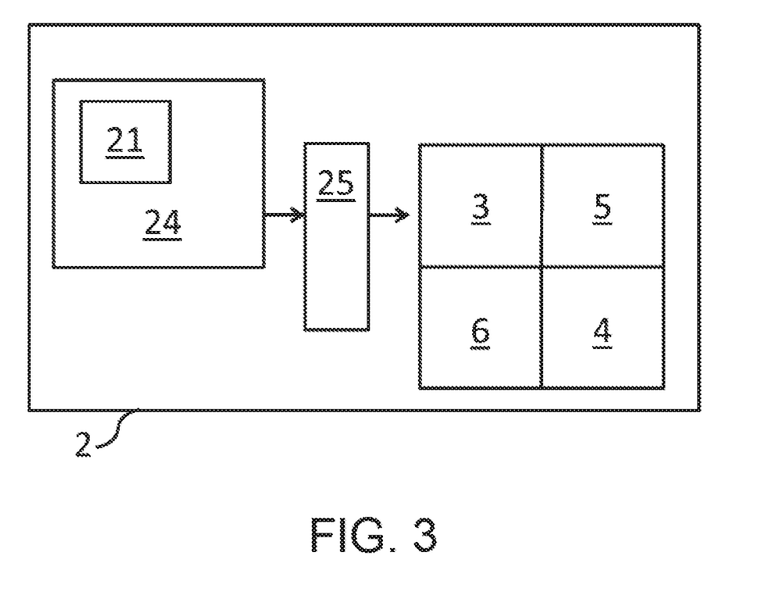
FIG. 3 shows a block diagram of the pixel group.

FIG. 3 shows an exemplary block diagram for the pixel group 2. The pixel group 2 includes the memory element 21, a memory control circuit 24 configured to write the second and first value to the corresponding memory element 21, and a conditioning circuit 25 configured to block and pass the transfer signal TS based on the value stored in the corresponding memory element 21.

FIG. 4 shows an exemplary block diagram for the pixel circuit 22. The pixel circuit 22 includes a first charge transfer device 26 configured to hold the photodiode PD at the constant voltage when the reset signal TD is sent to the pixel circuit 22. This can be done by a charge discarding device 29 which can include an electrical conductive connection of the first charge transfer device 26 to a ground and to a power supply. The pixel circuit 22 furthermore includes a second charge transfer device 27 configured to transfer the charge from the photodiode PD to the storage capacitance CFD when the transfer signal TS is sent to the pixel circuit 22. The pixel circuit 22 furthermore includes a storage device 39 that includes the storage capacitance $C_{FD}$ and is configured to discharge the storage capacitance $C_{FD}$, when a storage capacitance discharging signal RS is sent to the pixel circuit. The pixel circuit includes a read-out circuit 28 which is configures to read out the charge in the storage capacitance $C_{FD}$, when a read-out signal RD is sent to the pixel circuit 22.

The photodiode PD is configured to allow a complete transfer of the charge from the photodiode PD to the storage capacitance $C_{FD}$, wherein the photodiode PD is in particularly selected from a group including a PIN (positive intrinsic negative)-photodiode and a buried photodiode.

The storage capacitance $C_{FD}$ is selected from a group consisting of a floating diffusion with an ohmic connection to a reset switch M7 (see FIG. 8), or a storage gate with an ohmic connection to the reset switch M7. In case the storage gate is selected, an additional transfer gate can be provided in order to provide a charge-coupled connection from a floating channel to a charge drain connection. In the case of the additional transfer gate, both the reset switch M7 and the additional gate are switched on in order to clear the storage gate of the accumulated charge.

The memory element 21 is selected from a group consisting of a six-transistor static RAM cell, a four-transistor static RAM cell, or a dynamic memory cell 37 including a memory capacitance CM, wherein the memory capacitance CM is selected from a group consisting of a diode junction in reverse bias, a MOS gate, in particular with a conductor made from metal or polysilicon, a Metal-Insulator-Metal (MIM) capacitor, a polysilicon-polysilicon capacitor, or a polysilicon-metal capacitor. The memory capacitance $C_{MEM}$ can be one item from this group or a plurality of items from this group.

Figure 7:
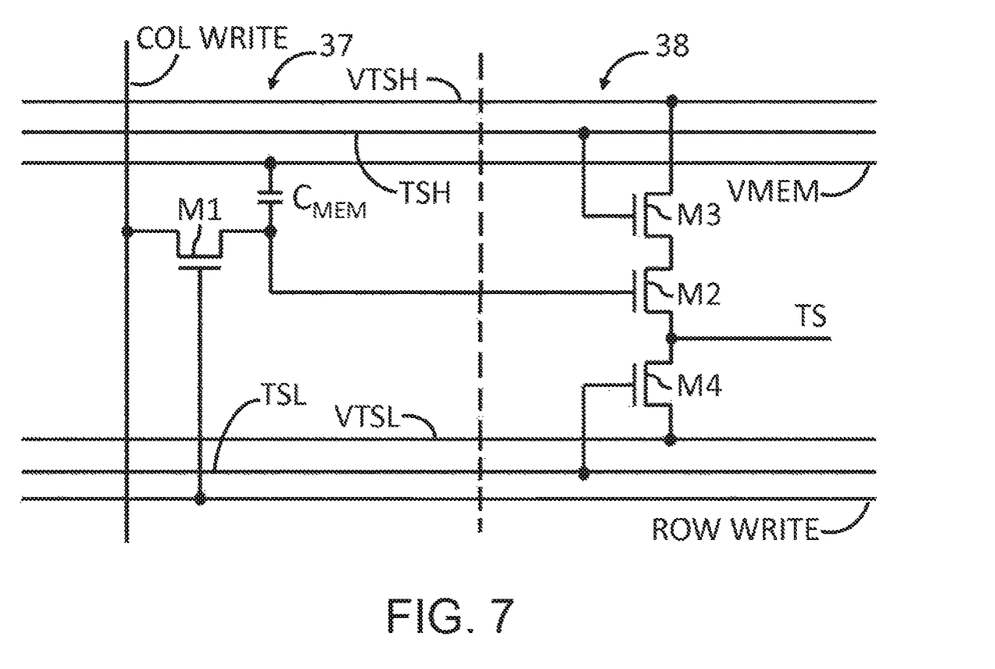
FIG. 7 shows exemplary embodiments of a memory element and of a conditioning circuit.

FIG. 7 shows an exemplary embodiment of the memory element 21 and the conditioning circuit 25. In this exemplary embodiment, the memory element 21 is the dynamic memory cell 37 and the conditioning circuit 25 is a dynamic logic AND gate 38. For writing the first or second value to the memory element 21, the memory element 21 is activated for writing by closing a switch M1 by applying a voltage on the line denoted with ROW WRITE. By applying the voltage on the line denoted with ROW WRITE, all of the memory elements 21 of a row of the pixel groups 2 are activated (see FIG. 1). The memory capacitance $C_{MEM}$ can then be either discharged corresponding to writing the first value to the memory element 21 or can be charged corresponding to writing the second value to the memory element 21 via the line denoted with COL WRITE. The writing of the memory elements is carried out for one row of the pixel groups 2 simultaneously by charging or discharging the memory capacitances $C_{MEM}$ via all of the lines denoted with COL WRITE according to FIG. 1.

According to FIG. 7, the dynamic logic AND gate includes switches M2, M3 and M4. All of the switches M1 to M4 according to FIG. 7 can, for example, be MOS transistors. The dynamic logic AND gate 38 includes two INPUTs, an OUTPUT and a PRECHARGE. The transfer signal TS includes a high transfer signal TSH that is sent to the dynamic logic AND gate 38 via the line denoted with TSH and a low transfer signal TSL that is substantially inverse to the high transfer signal TSH and that is sent to the dynamic logic AND gate 38 via the line denoted with TSL. The memory capacitance $C_{MEM}$ is electrically conductive connected to one of the INPUTs of the dynamic logic AND gate 38. The line denoted with TSH is electrically conductive connected to the other one of the INPUTs of the dynamic logic AND gate 38. The line denoted with TSL is electrically conductive connected to the PRECHARGE of the dynamic logic AND gate 38. The OUTPUT of the dynamic logic AND gate 38 is electrically conductive connected to the pixel circuit 22 for sending the transfer signal TS to the pixel circuit 22. VTSH and VTSL are effectively the voltage signals which are switched on to the TS output when the corresponding signals TSH and TSL are active. They are reference voltages or supply voltages that are used to determine the voltage levels appearing at the TS output and hence at the gate terminals of the corresponding transfer gates. VTSH and VTSL might be shared with the VDD and GND signals shown in FIG. 8 respectively. VMEM denotes the power supply for charging or discharging the memory capacitance $C_{MEM}$.

FIG. 8 shows an exemplary embodiment of the pixel circuit 22. $V_{DD}$ denotes a power supply. The first charge transfer device 26 includes a switch M5. The second charge transfer device 27 includes a switch M6 that is electrically connected to the conditioning circuit 25 for receiving the transfer signal TS. The storage device 39 includes the storage capacitance $C_{FD}$ and a switch M7 with which the storage capacitance $C_{FD}$ can be cleared. The read-out circuit 28 includes the switches M8 to M11 and a voltage follower storage capacitance $C_{ST}$. The read-out circuit 28 includes a voltage follower that is formed by the switches M8 and M9 and the voltage follower storage capacitance $C_{ST}$. Switch 9 can be activated by a signal PRE, which is provided in order to reduce the power consumption of the voltage follower. The charge in the voltage follower storage capacitance $C_{ST}$ can be read out via the line denoted with COL READ after activation of switch M11 by the read-out signal RD. The read-out signal RD can be sent to all the switches M11 of a row of the pixels 3 to 6 via the line denoted with ROW READ (see FIG. 1). Devices M5 to M11 can be for example transfer gates and/or MOS transistors.

As it can be seen in FIG. 1, the imaging system is configured to write the second value to each of the memory elements 21 and includes for each column an electronic comparator COMP configured to compare the charge in the storage capacitance $C_{FD}$ to a predefined reference charge. The electronic comparator COMP is configured to write the first value to the memory element 21 corresponding to the storage capacitance $C_{FD}$ in case the charge in the storage capacitance $C_{FD}$ exceeds the predefined reference charge. It is also possible that the electronic comparator is configured to write the second value to the memory element 21 corresponding to the storage capacitance $C_{FD}$ in case the charge in the storage capacitance $C_{FD}$ is below or equal to the predefined reference charge. The predefined reference charge can be the same for all the comparators COMP-1 to COMP-n for all the different columns. Furthermore, FIG. 1 shows that the imaging system can include for each of the columns an analog-to-digital converter ADC-1 to ADC-n and a low voltage differential signal driver LVDS-1 to LVDS-n.

FIG. 5 illustrates the procedure of reading-out the pixels 3 to 6 and writing the memory elements 21. First, as shown in the first column of FIG. 5, the first row of the pixel groups 2 is read out. Subsequently, as shown in the second column of FIG. 5, the second row of the pixel groups 2 is read out while simultaneously either the first or the second value is written to the memory elements 21 of the first row of the pixel groups 2. Subsequently, as shown in the third column of FIG. 5, the third row of the pixel groups 2 is read out while simultaneously either the first or the second value is written to the memory elements 21 of the second row of the pixel groups 2. This procedure is continued until all the pixels 3 to 6 have been read-out and the first or second value has been written to all the memory elements 21. Since the reading-out and the writing is carried out simultaneously, this leads to a high repetition rate for recording images.

As an alternative to using the electronic comparators COMP, the imaging system can be configured to write the second value to each of the memory elements 21 and, after a predetermined number of accumulation cycles 11 to 14 including for each of the pixels 3 to 6 one of the reset signals $TD_1$ to $TD_4$ and one of the transfer signals TS, the first value to each of the memory elements 21. The imaging system is further configured such that a different number of the accumulation cycles 11 to 14 can be predetermined for each the memory elements 21.

The imaging system can be used in a distance measuring device for measuring a distance between the distance measuring device and an object as illustrated in FIGS. 2, 3, 6, and 9. The distance measuring device includes a light source (not shown) configured to illuminate the object with light pulses. The light pulses can be in the visible and/or infrared wavelength region. The imaging system is configured to capture the light pulses after being back reflected from the object. The trigger generator is configured to start the emission of the light pulses at an emission start point in time 10 and the distance measuring device is configured to measure a time of flight $T_{TOF}$ of the light pulse from the emission start point in time 10 to the arrival on the respective pixel group 2 by using the charge in the storage capacitances $C_{FD}$.

As it can be seen in FIGS. 2 and 3, each of the pixel groups 2 includes a first measurement pixel 3, a second measurement pixel 4, a reference pixel 5 and a background pixel 6. $TD_1$ denotes the reset signal for the first measurement pixel, $TD_2$ denotes the reset signal for the reference pixel 5, $TD_3$ denotes the reset signal for the background pixel 6, and $TD_1$ denotes the reset signal for the second measurement pixel 4.

Figure 6:
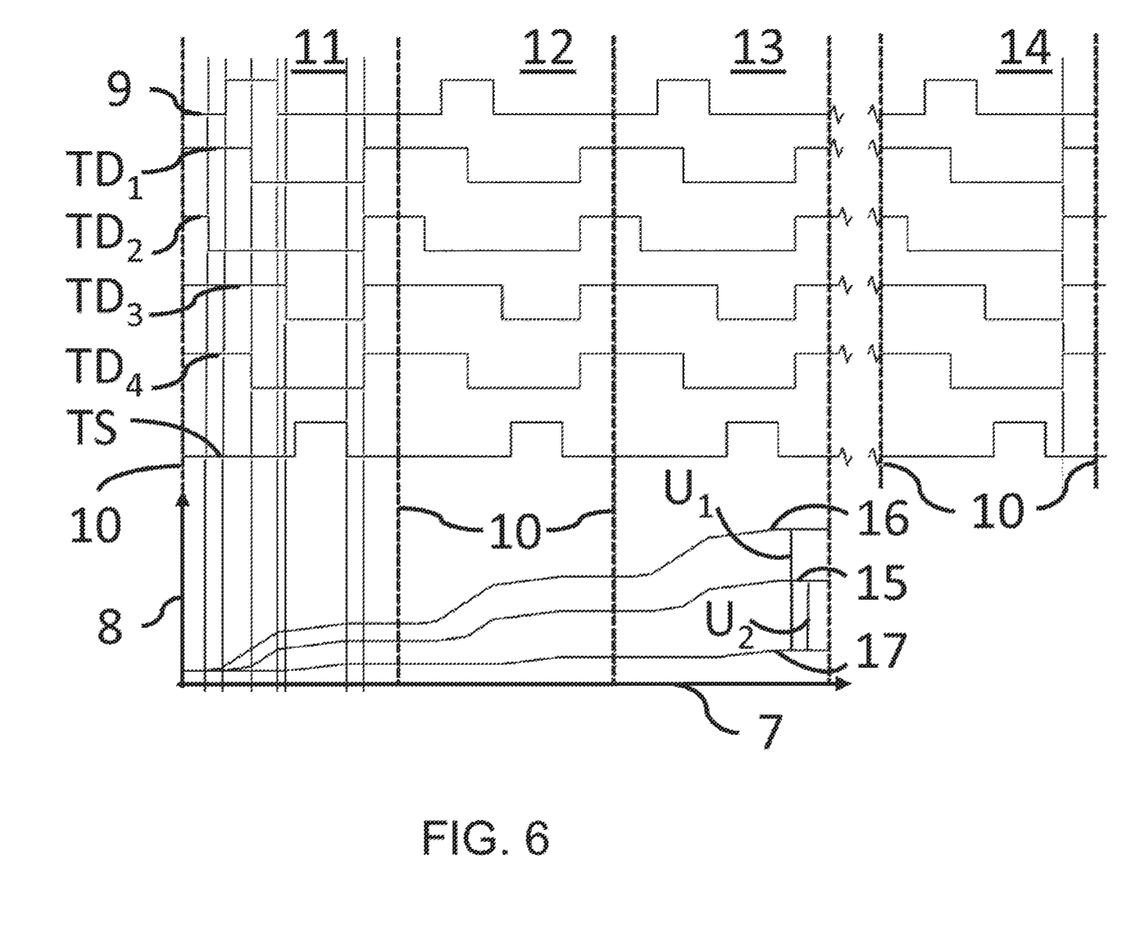
FIG. 6 shows a plurality of accumulation cycles including the charge accumulated during the accumulation cycles.

FIG. 6 shows a diagram in which the time is plotted over an abscissa 7, and various measurements are plotted over the ordinate 8. The reset signals $TD_1$ to $TD_4$, the transfer signal TS and a temporal intensity profile 9 of the intensity of the back reflected light pulse arriving on the pixel group 2 are plotted in the diagram for a plurality of the accumulation cycles 11 to 14. The photodiodes PD of the pixels 3 to 6 can only capture the light pulse when the corresponding reset signals $TD_1$ to $TD_4$ are switched off, i.e., when the corresponding reset signals $TD_1$ to $TD_4$ in FIG. 6 are low. As it can be seen in FIG. 6, the trigger generator is configured to control the reset signals $TD_1$ to $TD_4$ such that for a predetermined range of the distance, the reset signal $TD_1$ for the first measurement pixel 3 and the reset signal $TD_4$ for the second measurement pixel 4 are delayed to the emission start point in time 10 so that the photodiodes PD of the measurement pixels 3, 4 are configured to capture the light pulse partially, the reset signal $TD_2$ for the reference pixel 5 is delayed to the emission start point in time 10 so that the photodiode PD of the reference pixel 5 is configured to capture the light pulse completely and the reset signal $TD_3$ for the background pixel 6 is delayed to the emission start point in time 10 so that the photodiode PD of the background pixel 6 is inhibited to capture the light pulse.

FIG. 6 also shows how the charge in the storage capacitances $C_{FD}$ grows over the accumulation cycles 11 to 14. Reference number 15 denotes the accumulated charge of the first measurement pixel 3, reference number 16 denotes the accumulated charge of the reference pixel 5, and reference number 17 denotes the accumulated charge of the background pixel 6. $U_1$ denotes the background corrected charge of the reference pixel 5 and $U_2$ denotes the background corrected charge of the measurement pixel 3.

Figure 9:
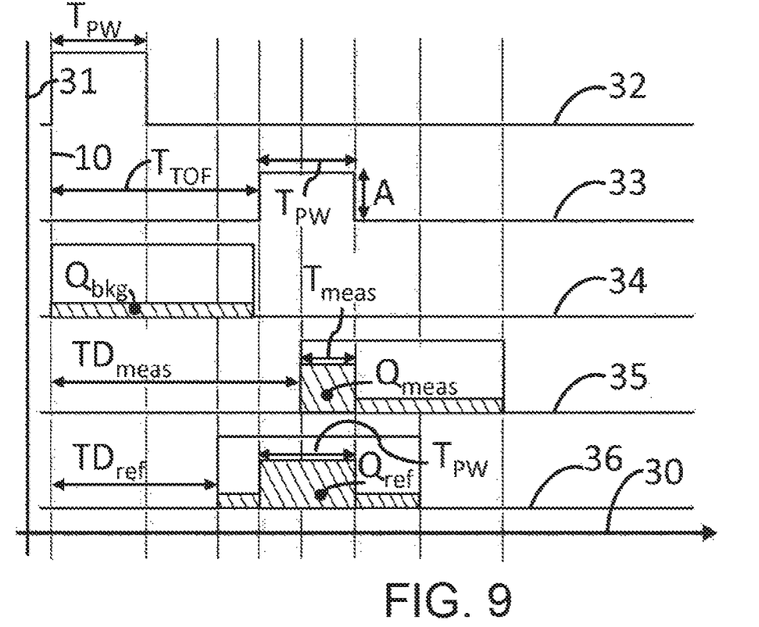
FIG. 9 shows a trigger scheme for deriving a time of flight.

FIG. 9 illustrates how the distance of the object to the distance measurement can be derived from the accumulated charges 15, 16, and 17. FIG. 9 shows a diagram in which the time is plotted over an abscissa 30 and various intensities are plotted over an ordinate 31. Reference number 32 denotes the intensity of the emitted light pulse. The light pulse is emitted at the emission start point in time 10. Reference number 32 denotes the intensity of the back reflected light pulse arriving on the pixel group 2, wherein A is the amplitude of this intensity. The pulse width of the light pulse is denoted with $T_{PW}$. The time of flight $T_{TOF}$ is the difference in time between the emission start point in time 10 and the first point in time when the light pulse arrives on the pixel group 2. Reference number 34 denotes the shutter of the background pixel 6, i.e., the time when the reset signal $TD_3$ is switched off, reference number 35 denotes the shutter of the measurement pixel 3, i.e., the time when the reset signal $TD_1$ is switched off, and reference number 36 denotes the shutter of the reference pixel 5, i.e., the time when the reset signal $TD_2$ is switched off. When the shutters 34 to 36 have a high value, it means that they are open. When the shutters 34 to 36 have a low value, it means that they are closed. $TD_{meas}$ denotes the duration from the emission start point in time 10 to the first point in time when the shutter of the measurement pixel 3 opens. $TD_{ref}$ denotes the duration from the emission start point in time 10 to the first point in time when the shutter of the reference pixel 5 opens.

The grey area denoted with $Q_{bkg}$ is proportional to the accumulated charge of background pixel 6. The grey area denoted with $Q_{meas}$ is proportional to the accumulated charge of the measurement pixel 3, and the grey area denoted with $Q_{ref}$ is proportional to the accumulated charge of the reference pixel 5. The distance can now be derived in the following manner:

1) balance timings:

$$T_{TOF}+T_{PW}=TD_{meas}+T_{meas}$$

$$T_{TOF}=TD_{meas}-T_{PW}+T_{meas}$$

2) extract $T_{meas}$:

$$Q_{meas}=A \cdot T_{meas}+Q_{bkg}$$

$$Q_{ref}=A \cdot T_{PW}+Q_{bkg}$$

$$\frac{(Q_{meas}-Q_{bkg})}{(Q_{ref}-Q_{bkg})}=\frac{(A \cdot T_{meas})}{(A \cdot T_{PW})}$$

$$\frac{T_{PW}(Q_{meas}-Q_{bkg})}{(Q_{ref}-Q_{bkg})}=T_{meas}$$

$Q_{meas}-Q_{bkg}$ is $U_2$ of FIG. 6 and $Q_{ref}-Q_{bkg}$ is $U_1$ of FIG. 6.

3) reinsert:

$$T_{TOF}=TD_{meas}-T_{PW}+\frac{T_{PW}(Q_{meas}-Q_{bkg})}{(Q_{ref}-Q_{bkg})}$$

$$T_{TOF}=TD_{meas}+T_{PW}\left(\frac{(Q_{meas}-Q_{bkg})}{(Q_{ref}-Q_{bkg})}-1\right)$$

4) convert to distance:

$$d=\frac{c \cdot T_{TOF}}{2}$$

c is the speed of light.

Figure 10:
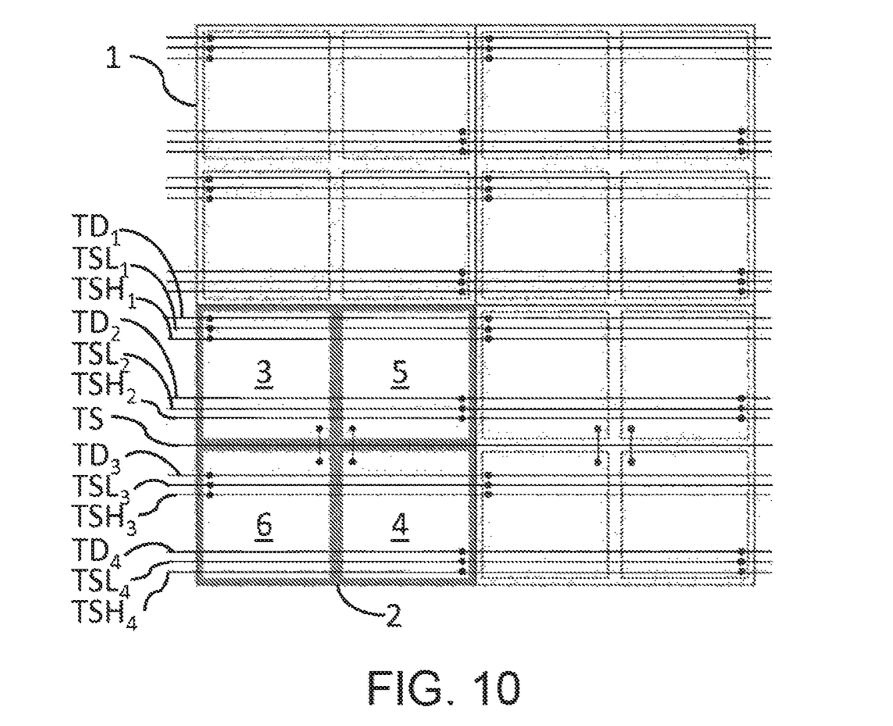
FIG. 10 shows an exemplary embodiment of the imaging system.

FIG. 10 shows an exemplary embodiment of the imaging system in which a low reset signal $TSL_1$ and a high reset signal $TSH_1$ is provided to the first measurement pixel 3, a low reset signal $TSL_2$ and a high reset signal $TSH_2$ is provided to the reference pixel 5, a low reset signal $TSL_3$ and a high reset signal $TSH_3$ is provided to the background pixel 6, and a low reset signal $TSL_4$ and a high reset signal $TSH_1$ is provided to the second measurement pixel 4. This results in different timings of the transfer signals Ts for each of the pixels 3 to 6.

This can for example be realized by corresponding instances of the conditioning circuit 38 in each of the pixel groups 2 for each such pair of the low reset signal $TSL_x$ and the high reset signal $TSH_x$. All of the conditioning circuits 38 of the four pixels 3 to 6 can be connected to one of the memory elements 21. The different timings of the transfer signals correspond to different timings of the closing of the shutter for the different pixels 3 to 6. In the same way, independent control of the reset signals TD allows the light pulses to be captured entirely, partially, or not at all, such independent control of the transfer timings also allows the light pulses to be captured entirely, partially, or not at all. In the former case, the moment of opening of the shutter is used to determine how much of the optical pulse is captured. In the latter case, the moment of closing of the shutter is used to determine how much of the light pulse is captured.

It is further typical that this independent control of the transfer signals TS is combined with the independent control of the reset signals TD, to provide independent control of both the opening and closing of the shutter of the pixels 3 to 6 in the pixel group 2. This makes it possible to control the opening duration of the shutter for each of the pixels 3 to 6 in the pixel group 2. Without this feature, those pixels 3 to 6 where the shutter opens earliest, for example, the background pixels 6, experience a longer capture duration than those where the shutter opens later, for example the measurement pixels 3, 4 (see FIG. 6). This is disadvantageous in that the amount of the background illumination captured is different for the different pixels 3 to 6. It is further disadvantageous in that the minimum separation between successive optical pulses, when it is desired to capture a single light pulse for each of the accumulation cycles 11 to 14, is determined by the longest capture duration, which is determined by the time from the earliest of the reset signals TD to the single transfer signal TS, where the timing of the single transfer signal TS must be late enough to also allow for the latest of the reset signals TD plus some minimum capture time. This represents a limitation to the maximum pulse repetition rate and duty-cycle that can be used, which is removed when independent control of the capture duration is available, by the additional transfer signals TS.

It is understood that the foregoing description is that of the exemplary embodiments of the invention and that various changes and modifications may be made thereto without departing from the spirit and scope of the invention as defined in the appended claims.

LIST OF REFERENCE NUMERALS

1 imaging sensor
2 pixel group
3 first measurement pixel
4 second measurement pixel
5 reference pixel
6 background pixel
7 abscissa denoting time
8 ordinate
9 temporal intensity profile
10 emission start point in time
11 first accumulation cycle
12 second accumulation cycle
13 third accumulation cycle
14 n-th accumulation cycle
15 accumulated charge of first measurement pixel
16 accumulated charge of reference pixel
17 accumulated charge of background pixel
21 memory element
22 pixel circuit
24 memory control circuit
25 conditioning circuit
26 first charge transfer device
27 second charge transfer device
28 read-out circuit
29 discarding charge means
30 abscissa denoting time
31 ordinate
32 intensity of emitted light pulse
33 intensity of light pulse arriving on the pixel group
34 shutter of background pixel
35 shutter of measurement pixel
36 shutter of reference pixel
37 dynamic memory cell
38 dynamic logic AND gate
39 storage device
$TD_1$ reset signal of first measurement pixel
$TD_2$ reset signal of reference pixel
$TD_3$ reset signal of background pixel
$TD_4$ reset signal of second measurement pixel
TS transfer signal
SH high transfer signal
TSL low transfer signal
RS storage capacitance discharging signal RD read-out signal
$U_1$ background corrected reference signal
$U_2$ background corrected measurement signal
PD photodiode
$C_{DF}$ storage capacitance
$C_{ST}$ voltage follower storage capacitance
COMP electronic comparator
ADC analog-to-digital converter
LVDS low voltage differential signal driver
$C_{MEM}$ Memory capacitance
$T_{TOF}$ time of flight
A intensity
$T_{PW}$ pulse width of light pulse
$Q_{bkg}$ accumulated charge of background pixel
$Q_{meas}$ accumulated charge of measurement pixel
$Q_{ref}$ accumulated charge of reference pixel
$T_{meas}$ duration of overlap between back reflected light pulse and shutter of measurement pixel
$TD_{meas}$ first point in time when the shutter of the measurement pixel 3 opens
$TD_{ref}$ first point in time when the shutter of the reference pixel 5 opens

What is claimed is:

1. An imaging system comprising:
a plurality of pixel groups, wherein a pixel group of the plurality of pixel groups comprises
a pixel,
a programmable memory element configured to store a first value or a second value, and
a pixel circuit comprising a photodiode, a first charge transfer device, a second charge transfer device, a storage device that includes a storage capacitance and is configured to discharge the storage capacitance, and a read-out circuit configured to read out a change on the storage capacitance; and
a trigger generator configured to generate a reset signal and a transfer signal, wherein the transfer signal is generated during an interval during which the reset signal is off,
wherein
the pixel circuit, the trigger generator, and the programmable memory element are interconnected to permit the first charge transfer device to hold the photodiode at a constant voltage while the trigger generator sends the reset signal to the pixel circuit,
the photodiode is configured to accumulate a charge while the photodiode is electromagnetically irradiated and the reset signal is off,
the second charge transfer device is configured to transfer the charge from the photodiode to the storage capacitance in response to the transfer signal being generated by the trigger generator and sent to the pixel circuit, and
the programmable memory element is configured to:
in response to determining that the programmable memory element stores the first value, block the transfer signal from arriving at the pixel circuit, and
in response to determining that the programmable memory element stores the second value, pass the transfer signal to the pixel circuit.

2. The imaging system according to claim 1, wherein the pixel group further comprises:
a memory control circuit configured to write the second value and the first value to a corresponding programmable memory element, and
a conditioning circuit configured to block, pass, or block and pass the transfer signal based on which of the first value or the second value is stored in the programmable memory element.

3. The imaging system according to claim 2, wherein:
the conditioning circuit is a dynamic logic AND gate,
the memory element is a dynamic memory cell comprising a memory capacitance,
the memory capacitance is one of a diode junction in reverse bias, a metal-oxide-silicon (MOS) gate, a Metal-Insulator-Metal capacitor, a polysilicon-polysilicon capacitor, or a polysilicon-metal capacitor,
the transfer signal comprises a high transfer signal and a low transfer signal that is substantially inverse to the high transfer signal,
the memory capacitance is electrically connected to a first input of the dynamic logic AND gate,
the high transfer signal is electrically connected to a second input of the dynamic logic AND gate,
the low transfer signal is electrically connected to a precharge of the dynamic logic AND gate, and
an output of the dynamic logic AND gate is electrically connected to the pixel circuit and configured to send the transfer signal to the pixel circuit.

4. The imaging system according to claim 1, wherein:
the memory element is one of a six-transistor static random-access memory (RAM) cell, a four-transistor static RAM cell, or a dynamic memory cell comprising a memory capacitance, and
the memory capacitance is one of a diode junction in reverse bias, a metal-oxide-silicon (MOS) gate, a Metal-Insulator-Metal capacitor, a polysilicon-polysilicon capacitor, or a polysilicon-metal capacitor.

5. The imaging system according to claim 1, wherein:
the photodiode is configured to allow a complete transfer of the charge from the photodiode to the storage capacitance, and
the photodiode is one of a positive intrinsic negative photodiode or a buried photodiode.

6. The imaging system according to claim 1, wherein the storage capacitance is one of
a floating diffusion with an ohmic connection to a reset switch, or
a storage gate with an ohmic connection to the reset switch, the storage gate associated with an additional transfer gate that provides a charge-coupled connection from a floating channel to a charge drain connection.

7. The imaging system according to claim 1, further comprising an electronic comparator configured to:
compare an amount of the charge on the storage capacitance to a predefined reference charge value, and
write the first value to the programmable memory element in response to a determination that the amount of the charge on the storage capacitance exceeds the predefined reference charge value.

8. The imaging system according to claim 1, wherein the imaging system is configured to:
write the second value to the programmable memory element,
write the first value to the programmable memory element after a defined number of accumulation cycles including the reset signal and the transfer signal, and
determine a different number of the accumulation cycles for respective programmable memory elements of the plurality of pixel groups.

9. The imaging system according to claim 1, wherein:
the trigger generator is configured to send different transfer signals the pixel,
the pixel group further comprises an additional programmable memory element for each of the different transfer signals for blocking and passing the transfer signal, and
the imaging system is configured to write the second value only to the additional programmable memory elements.

10. The imaging system according to claim 1, further comprising:
an imaging sensor comprising an integrated circuit in which the pixel circuit and the programmable memory element are arranged.

11. A distance measuring device comprising:
a light source configured to illuminate an object with light pulses, and
an imaging system according to claim 1 configured to capture a subset of the light pulses reflected from the object,
wherein
the trigger generator is configured to start an emission of the light pulses at an emission start point in time, and
the distance measuring device is configured to measure a time of flight of the subset of the light pulses from the emission start point in time to an arrival of the subset of the light pulses on the pixel group based on the charge in the storage capacitance, and determine a distance between the distance measuring device and the object based on the time of flight.

12. The distance measuring device according to claim 11, wherein the trigger generator is configured to control the reset signal such that, for a defined range of the distance, the reset signal for the pixel is delayed to the emission start point in time to permit the photodiode of the pixel to partially capture a light pulse of the subset of the light pulses.

13. The distance measuring device according to claim 12, wherein:
the pixel group comprises three pixels, and one of the three pixels is a distance measurement pixel,
the trigger generator is configured to
send reset signals with respective different delays relative to the emission start point in time to respective pixel circuits of the three pixels, and
control the reset signals such that for the defined range of the distance, the reset signal for a reference pixel of the three pixels is delayed to permit a photodiode of the reference pixel to completely capture a light pulse of the subset of the light pulses,
the reset signal for a background pixel of the three pixels is delayed to inhibit a photodiode of the background pixel to capture the light pulse, and
the imaging system is configured to measure the time of flight based on charges in storage capacitances respectively corresponding to three pixels.

14. The distance measuring device according to claim 13, wherein:
the pixel group comprises four pixels, the four pixels comprising two distance measuring pixels.

15. A method for operating a distance measuring device, the method comprising:
writing, by the distance measuring device of claim 11, the second value to the memory element;
starting the emission of the light pulses at the emission start point in time;
sending the reset signal to the pixel circuit;
switching off the reset signal;
sending the transfer signal to the pixel circuit during an interval in which the reset signal is off; and writing the first value to the memory element in response to determining that a predetermined condition is fulfilled.

16. The method according to claim 15, wherein:
the sending the reset signal comprises sending different reset signals to different sets of pixel groups including the pixel group, and
the writing the second value comprises writing the second value to memory elements of one of the sets of pixel groups after a defined number of accumulations cycles of the sending of the reset signal, the switching off of the reset signal, and the sending of the transfer signal.

17. The method according to claim 15, wherein:
the pixel group comprises three pixels including the pixel,
the reset signal is controlled so that the reset signal is delayed to the emission start point in time to permit for a defined range of the distance, wherein the reset signal for a measurement pixel of the three pixels is delayed to permit a first photodiode of the measurement pixel to capture the a light pulse of the subset of the light pulses partially,
the reset signal for a reference pixel of the three pixels is delayed to permit a second photodiode of the reference pixel to completely capture the light pulse,
the reset signal for a background pixel of the three pixels is configured to inhibit a third photodiode of the background pixel to capture the light pulse.

18. The method according to claim 17, further comprising:
reading out the charge U on the storage capacitance; and
calculating the time of flight $T_{TOF}$ of the subset of the light pulses according to i $T_{TOF}=a+b*U_2/U_1$, wherein $U_1=U_{REF}-U_{BKG}$, i $U_2=U_{MEAS}-U_{BKG}$, $U_{REF}$ is U for the reference pixel,
$U_{BKG}$ is U for the background pixel,
$U_{MEAS}$ is U for the measurement pixel, and
a and b are constants.

19. A method for operating an imaging system, the method comprising:

writing, by an imaging system according to claim 1, the second value to the memory element;
sending the reset signal to the pixel circuits;
switching off the reset signal;
sending the transfer signal to the pixel circuit during an interval in which the reset signal is off; and
writing the first value to the memory element in response to determining that a predetermined condition is fulfilled.

20. The method according to claim 19, further comprising:
comparing an amount of the charge on the storage capacitance to a predefined reference charge value after a predetermined number of accumulation cycles including the sending of the reset signal, the switching off of the reset signal, and the sending of the transfer signal;
wherein the writing the first value comprises writing the first value to the memory element that corresponds to the storage capacitance in response to determining that the amount of the charge on the storage capacitance exceeds the predefined reference charge value.

21. The method according to claim 20, further comprising:
repeating performance of the accumulation cycles until the amount of the charge on the storage capacitance exceeds the predefined reference charge value.

22. The method according to claim 19, further comprising:
defining, for the memory element, a number $n_2$ of accumulation cycles comprising iterations of the sending of the reset signal, the switching off of the reset signal, and the sending of the transfer signal;
wherein the writing the first value comprises writing the first value to the memory element in response to completion of $n_2$ accumulation cycles.

23. The method according to claim 22, further comprising:
wherein the defining the number $n_2$ comprises selecting the number $n_2$ based on brightness information for the pixel group obtained from an image previously recorded by the imaging system or based on expected brightness information for the pixel group.

* * * * *